US012694034B1

(12) United States Patent
Gilboa et al.

(10) Patent No.: US 12,694,034 B1
(45) Date of Patent: Jul. 28, 2026

(54) AI-POWERED VIRTUAL TAG COVERAGE EXPANSION

(71) Applicant: Finout Ltd, Tel Aviv (IL)

(72) Inventors: Zohar Yizhar Gilboa, Rehovot (IL); Asaf Josef Liveanu, Herzliya (IL); Roi Rav-Hon, New York, NY (US)

(73) Assignee: Finout Ltd, Tel Aviv (IL)

( * ) Notice: Subject to any disclaimer, the term of this patent is extended or adjusted under 35 U.S.C. 154(b) by 0 days.

(21) Appl. No.: 19/577,580

(22) Filed: Mar. 25, 2026

(51) Int. Cl.
| | |
|---|---|
| *G06F 16/20* | (2019.01) |
| *G06F 16/23* | (2019.01) |
| *G06F 16/2455* | (2019.01) |
| *G06F 16/2457* | (2019.01) |

(52) U.S. Cl.
CPC .... G06F 16/24573 (2019.01); G06F 16/2365 (2019.01); G06F 16/24564 (2019.01)

(58) Field of Classification Search
CPC ........... G06F 16/24573; G06F 16/2365; G06F 16/24564
See application file for complete search history.

(56) References Cited

U.S. PATENT DOCUMENTS

| | | | | |
|---|---|---|---|---|
| 12,147,322 | B1 * | 11/2024 | Gilboa | ................ G06F 11/3006 |
| 2024/0185002 | A1 * | 6/2024 | Atlan | .................... G06F 16/435 |

| | | | | |
|---|---|---|---|---|
| 2024/0338532 | A1 * | 10/2024 | Pauli | ....................... G06F 40/40 |
| 2025/0245426 | A1 * | 7/2025 | Chen | ..................... G06F 16/383 |
| 2026/0073278 | A1 * | 3/2026 | Khandeparkar | ....... G06N 20/00 |

OTHER PUBLICATIONS

Article entitled "LLM4Tag: Automatic Tagging System for Information Retrieval via Large Language Models" issued to Tang et al., dated 2025 (Year: 2025).*
Article entitled "TAGIFY: LLM-powered Tagging Interface for Improved Data Findability on OGD Portals" issued to Kliimask et al., dated 2024 (Year: 2024).*

* cited by examiner

*Primary Examiner* — Mahesh H Dwivedi

(57) ABSTRACT

There is provided a method, comprising: extracting untagged resource records from a database including resource values indicating utilization of resources of a cloud computing environment, generating a key-value distribution associating aggregated resource values with tag key/tag value pairs extracted from each of the untagged resource records, generating a structured prompt including: existing rules for generating virtual tags, the key-value distribution, and instructions for identifying tag keys of the untagged resource records that are semantically related to a concept represented by virtual tags generated based on the existing rules, and for computing a new rule(s) for generating a new virtual tag and/or for expanding coverage of an existing virtual tag(s) according to the identified tag keys, feeding the structured prompt into an LLM to obtain new rule(s), and adding the new rule(s) to a rule repository for application to the untagged resource records and to new untagged resource records.

19 Claims, 9 Drawing Sheets

Key SQL Query Pattern for Untagged Analysis

```
SELECT
    key,
    value,
    SUM(cost) as total_cost,
    COUNT(*) as record_count
FROM cost_data
WHERE virtual_tag_value = 'Untagged'
  AND key NOT IN (excluded_system_tags)
GROUP BY key, value
HAVING total_cost > threshold
ORDER BY total_cost DESC
```

800

AI Prompt Structure for Rule Generation

Given the virtual tag "{name}" with existing rules:
{existing_rules_summary}

And the following untagged cost data key-value
distribution:
{key_value_distribution}

Generate new rules that would reduce untagged
costs by identifying
semantically related tag keys. For each
suggestion, provide:
- The complete rule specification
- Reasoning for why this key is relevant
- Estimated coverage improvement

AI-POWERED VIRTUAL TAG COVERAGE EXPANSION

BACKGROUND

The present invention, in some embodiments thereof, relates to cloud computing and, more specifically, but not exclusively, to systems and methods for generating virtual tags for cloud computing environments.

Virtual tags in cloud computing environments provide a flexible, software-defined method for associating metadata with dynamic resources such as virtual machines, containers, and storage. Unlike physical labels, these tags can be created, modified, or removed without affecting the underlying infrastructure, enabling automated management, policy enforcement, cost tracking, and compliance auditing.

SUMMARY

According to a first aspect, a computer implemented method of automatically generating rules for expanding coverage of existing virtual tags and/or for generation of new virtual tags of a cloud computing environment, comprising: managing a database of resource records, wherein each resource record includes a resource value indicating utilization of a resource of a plurality of resources of the cloud computing environment, wherein the database includes a plurality of untagged resource records and a plurality of tagged resource records, extracting the plurality of untagged resource records from the database, generating a key-value distribution associating aggregated resource values with tag key/tag value pairs extracted from each of the plurality of untagged resource records, generating a structured prompt including: existing rules for generating virtual tags, the key-value distribution, and instructions for identifying tag keys of the plurality of untagged resource records that are semantically related to a concept represented by virtual tags generated based on the existing rules, and for computing at least one new rule according to the identified tag keys, the at least one new rule is for generating at least one new virtual tag and/or for expanding coverage of at least one existing virtual tag, feeding the structured prompt into a large language model (LLM), receiving the at least one new rule from the LLM, and adding the at least one new rule to a rule repository associated with the database for application to the plurality of untagged resource records and to new untagged resource records.

According to a second aspect, a system for automatically generating rules for expanding coverage of existing virtual tags and/or for generation of new virtual tags of a cloud computing environment, comprising: at least one processor executing a code for: managing a database of resource records, wherein each resource record includes a resource value indicating utilization of a resource of a plurality of resources of the cloud computing environment, wherein the database includes a plurality of untagged resource records and a plurality of tagged resource records, extracting the plurality of untagged resource records from the database, generating a key-value distribution associating aggregated resource values with tag key/tag value pairs extracted from each of the plurality of untagged resource records, generating a structured prompt including: existing rules for generating virtual tags, the key-value distribution, and instructions for identifying tag keys of the plurality of untagged resource records that are semantically related to a concept represented by virtual tags generated based on the existing rules, and for computing at least one new rule according to the identified tag keys, the at least one new rule is for generating at least one new virtual tag and/or for expanding coverage of at least one existing virtual tag, feeding the structured prompt into a large language model (LLM), receiving the at least one new rule from the LLM, and adding the at least one new rule to a rule repository associated with the database for application to the plurality of untagged resource records and to new untagged resource records.

According to a third aspect, a non-transitory medium storing program instructions for expanding coverage of existing virtual tags and/or for generation of new virtual tags of a cloud computing environment, which when executed by at least one processor, cause the at least one processor to: manage a database of resource records, wherein each resource record includes a resource value indicating utilization of a resource of a plurality of resources of the cloud computing environment, wherein the database includes a plurality of untagged resource records and a plurality of tagged resource records, extract the plurality of untagged resource records from the database, generate a key-value distribution associating aggregated resource values with tag key/tag value pairs extracted from each of the plurality of untagged resource records, generate a structured prompt including: existing rules for generating virtual tags, the key-value distribution, and instructions for identifying tag keys of the plurality of untagged resource records that are semantically related to a concept represented by virtual tags generated based on the existing rules, and for computing at least one new rule according to the identified tag keys, the at least one new rule is for generating at least one new virtual tag and/or for expanding coverage of at least one existing virtual tag, feed the structured prompt into a large language model (LLM), receive the at least one new rule from the LLM, and add the at least one new rule to a rule repository associated with the database for application to the plurality of untagged resource records and to new untagged resource records.

In a further implementation form of the first, second, and third aspects, further comprising: receiving a new resource record generated for the cloud computing environment, wherein the new resource record is untagged, applying the at least one new rule to the new resource record for generating the new virtual tag and/or expanding coverage of the at least one existing virtual tag, storing an association between the new resource record and the new virtual tag and/or expanded existing virtual tag in the database.

In a further implementation form of the first, second, and third aspects, the new resource record is automatically generated in response to detected utilization of a resource of the plurality of resources.

In a further implementation form of the first, second, and third aspects, the at least one new rule comprises a plurality of candidate new rules, and further comprising: for each respective candidate rule of the plurality of candidate rules, simulating application of the respective candidate rule to the plurality of untagged resource records to simulate generation of virtual tags to obtain a simulated metric, ranking the plurality of new candidate rules according to corresponding simulated metrics, and selecting a highest ranked candidate rule, wherein the at least one new rule added to a rule repository comprises the highest ranked candidate rule.

In a further implementation form of the first, second, and third aspects, further comprising: computing a baseline total of a plurality of resource values for the plurality of untagged resource records, for each respective candidate rule of the plurality of candidate rules: the simulated metric comprises a simulated total of the plurality of resource values for a subset of the plurality of untagged records for which virtual tags were computed by the simulated application of the respective candidate rule, computing an absolute improvement provided by the simulated total for the respective candidate rule over the baseline total, wherein ranking comprises ranking the plurality of candidate rules according to corresponding absolute improvement, wherein the highest ranked candidate rule comprises the candidate rule with highest absolute improvement, wherein the at least one new rule added to the rule repository comprises the candidate rule with highest absolute improvement.

In a further implementation form of the first, second, and third aspects, further comprising: computing a baseline total of a plurality of resource values for the plurality of untagged resource records, for each respective candidate rule of the plurality of candidate rules: the simulated metric comprises a simulated total of the plurality of resource values for a subset of the plurality of untagged records for which virtual tags were computed by the simulated application of the respective candidate rule, computing a relative improvement provided by the simulated total for the respective candidate rule with respect to the baseline total, wherein ranking comprises ranking the plurality of candidate rules according to corresponding relative improvement, wherein the highest ranked candidate rule comprises the candidate rule with highest relative improvement, wherein the at least one new rule added to the rule repository comprises the candidate rule with highest relative improvement.

In a further implementation form of the first, second, and third aspects, the database includes tagged resource records tagged with virtual tags generated according to a plurality of existing rules hosted in a rule repository.

In a further implementation form of the first, second, and third aspects, extracting the plurality of untagged resource records from the database comprises generating a query for searching the database for untagged resource records, and executing the query to extract the plurality of untagged resource records.

In a further implementation form of the first, second, and third aspects, the database comprises a cost database, wherein each record comprises a cost record, and the resource value comprises a cost of using the resource.

In a further implementation form of the first, second, and third aspects, further comprising filtering tag keys to generate filtered tag keys that exclude cloud-provider system tag keys that are unrelated to a target concept, wherein the key-value distribution is generated from the filtered tag keys.

In a further implementation form of the first, second, and third aspects, the structured prompt further includes instructions for analyzing the existing rules to extract a plurality of target concepts being tagged and for generating the at least one new rule to generate the at least one virtual tag based on the plurality of target concepts.

In a further implementation form of the first, second, and third aspects, the structured prompt includes instructions for analyzing semantic relationships between: patterns of existing rules for generating virtual tags, available tag keys in the untagged resource records, and value patterns that suggest conceptual alignment.

In a further implementation form of the first, second, and third aspects, the LLM identifies at least one candidate tag key likely to be associated with values of the candidate tag key representing same or corresponding target concepts, wherein the LLM generates the at least one new rule based on the at least one candidate tag key.

In a further implementation form of the first, second, and third aspects, the LLM generates a rule specification including each new rule and at least one of: filter conditions, target allocation mapping, and reasoning explaining why a candidate tag key associated with the new rule is semantically relevant.

In a further implementation form of the first, second, and third aspects, the rule specification is generated for complying with a format of rules stored in a rule repository applied to new resource records.

In a further implementation form of the first, second, and third aspects, the LLM normalizes the tag values to comply with an existing taxonomy of the virtual tag.

In a further implementation form of the first, second, and third aspects, for tag keys that do not exactly match existing allocations of existing virtual tags, the LLM performs a semantic similarity analysis to generate mappings between observed tag values and existing allocation values, wherein the mappings are designed to preserve an existing taxonomy implemented by existing virtual tags while expanding coverage for including at least one new virtual tag and/or expanding coverage of the at least one existing virtual tag generated by the at least one new rule.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 6:
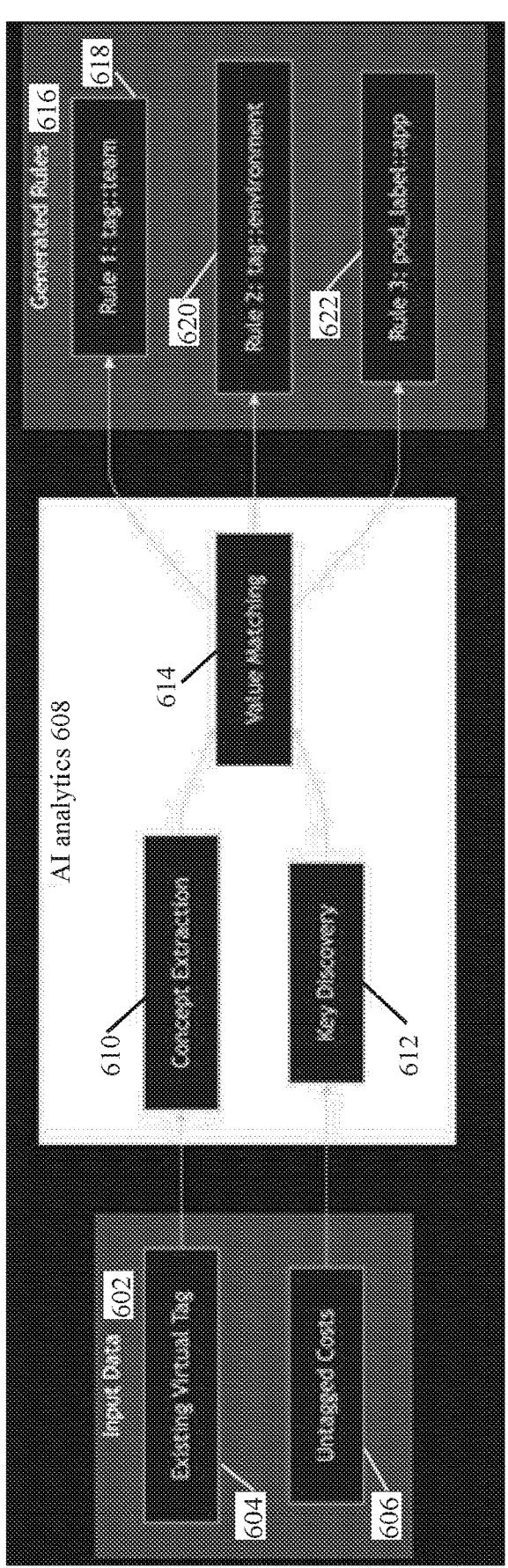
Figure 7:
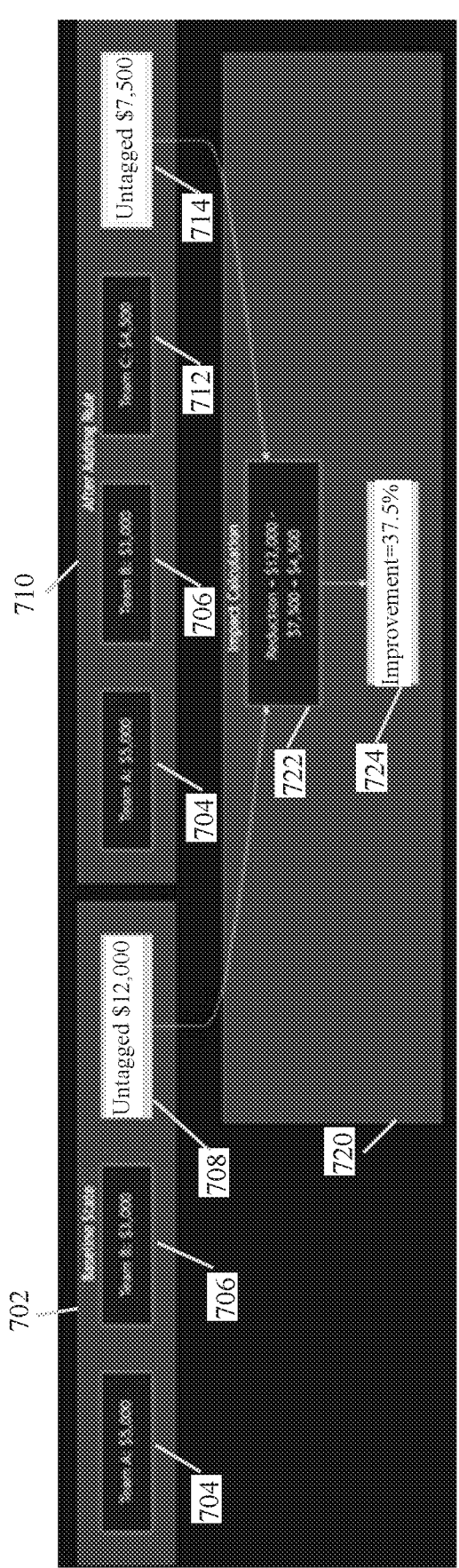
Figure 8:

FIG. 6 is a dataflow diagram for automatically generating rules for creation of virtual tags, in accordance with some embodiments of the present invention;

FIG. 7 is a schematic depicting an example of a reduction in a total resource value of untagged resource records in response to automated generation of at least one rule, in accordance with some embodiments of the present invention;

FIG. 8 is an example of a query for returning untagged resource records, in accordance with some embodiments of the present invention; and FIG. 9 is an example of a prompt for feeding into a LLM for generation of one or more candidate rules, in accordance with some embodiments of the present invention.

DETAILED DESCRIPTION

The present invention, in some embodiments thereof, relates to cloud computing and, more specifically, but not exclusively, to systems and methods for generating virtual tags for cloud computing environments.

An aspect of some embodiments of the present invention relates to systems, methods, computing devices, and/or code instructions (stored on a data storage device and executable by one or more processors) for automatically generating rules for expanding coverage of existing virtual tags of a cloud computing environment and/or for generation of new virtual tags of the cloud computing environment. A database of resource records associated with the cloud computing environment is managed. Each resource record includes a resource value indicating utilization of a resource of the cloud computing environment. The database includes untagged resource records and tagged resource records (i.e., tagged with virtual tags). The tags of the tagged resource records may be automatically generated by existing rules which may be hosted in a rule repository. Coverage of the existing rules is insufficient to automatically generate tags for the untagged resource records. The untagged resource records may be automatically extracted from the database and/or automatically identified, for example, by issuing a query to the database. A key-value distribution associating aggregated resource values with tag key/tag value pairs extracted from each of the untagged resource records, may be automatically computed and/or generated. A structured prompt is automatically generated. The structured prompt includes one or more (optionally all) of: the existing rules for generating virtual tags, the key-value distribution, and instructions for identifying tag keys of the untagged resource records that are semantically related to a concept(s) represented by virtual tags generated based on the existing rules. The structured prompt may further include instructions for computing at least one new rule according to the identified tag keys. The new rule(s) is designed for generating at least one new virtual tag and/or for expanding coverage of existing virtual tag(s). The structured prompt is fed into a large language model (LLM) and/or other machine learning (ML) model such as an artificial intelligence (AI) agent. One or more new rules generated by the LLM are received. The new rule(s) may be evaluated, for example, by simulating application of each respective new rule to the untagged resource records, and computing one or more metrics indicating impact of the application of the rule on the resource values of the untagged resource records-some of which are tagged by the simulated application. One or more new rules may be selected, optionally based on the results of the simulation. The new rules (e.g., selected rules) are added to the rule repository associated with the database for application to the untagged resource records and/or to newly generated untagged resource records.

As used herein, the term "coverage" (also referred to as "tag coverage" or "rule coverage") may refer to a degree to which a set of virtual tag generation rules successfully assigns at least one non-default virtual tag value to resource records in a set of untagged resource records.

In some embodiments, coverage may be computed with respect to a defined scope, for example, one or more of: a particular virtual tag definition, a particular cloud account, a particular resource type, a particular service, a particular time window, and/or a particular set of resource records returned by a query.

In some embodiments, coverage may be expressed as a record-based coverage metric, for example: Record coverage=(number of resource records that match at least one rule and are assigned a non-"untagged" virtual tag value)/(total number of resource records in the scope).

In some embodiments, coverage may be expressed as a value-based coverage metric, for example: Value coverage= (sum of resource values of resource records that match at least one rule and are assigned a non-"untagged" virtual tag value)/(sum of resource values of all resource records in the scope).

In some embodiments, an increase in coverage corresponds to a reduction in untagged resource records and/or a reduction in a total resource value associated with untagged resource records. In some embodiments, a rule is said to "expand coverage" when application of the rule causes additional previously-uncovered resource records (or an additional amount of resource value) to be assigned a non-default virtual tag value relative to a baseline configuration without the rule.

At least one embodiment addresses the technical problem of automatically expanding coverage of rules used to generate virtual tags for untagged resource records of a cloud computing environment. At least one embodiment improves the technology of cloud computing environments, by automatically expanding coverage of rules used to generate virtual tags for untagged resource records of the cloud computing environment. At least one embodiment improves upon existing approaches for automatically expanding coverage of rules used to generate virtual tags for untagged resource records of a cloud computing environment. At least one embodiment described herein provides the practical application of automatically expanding coverage of rules used to generate virtual tags for untagged resource records of a cloud computing environment.

At least one embodiment addresses the technical problem of automatically generating virtual tags for cloud computing environments. At least one embodiment improves the technology of cloud computing environments, by automatically generating virtual tags for cloud computing environments. At least one embodiment improves upon existing approaches for generating virtual tags for cloud computing environments. At least one embodiment described herein provides the practical application of automatically generating virtual tags for cloud computing environments.

At least one embodiment described herein addresses the technical problem of improving computational efficiency of a computer processing resource utilization records (e.g., cost records) of multiple different entities using multiple different resources of one or more cloud computing environments, in an efficient manner that is scalable to accommodate a large number of entities and/or resources, by automatically generating rules for increasing coverage of untagged resource records by generating virtual tags for the untagged resource records. At least one embodiment described herein improves computational efficiency of a computer (e.g., processor) processing resource utilization records (e.g., cost records) of multiple different entities using multiple different resources of one or more cloud computing environments, by automatically generating rules for increasing coverage of untagged resource records by generating virtual tags for the untagged resource records. At least one embodiment described herein improves upon prior approaches, by providing an approach for generating virtual tags that is automated and scalable. At least one embodiment described herein provides the practical application of improving computational efficiency of a computer (e.g., processor) processing resource utilization records (e.g., cost records) of multiple different entities using multiple different resources of one or more cloud computing environments by automatically generating rules for increasing coverage of untagged resource records by generating virtual tags for the untagged resource records.

The increase in computational efficiency is obtained by reducing the amount of untagged resource records, which enables a computer to more efficiently process the tagged resource records. Untagged resource records which cannot be processed automatically reduce the accuracy of the processed results, and/or may require specialized intervention such as customized code, which reduces efficiency of the computer performing the processing.

In at least one embodiment, increasing coverage of virtual tag rules improves computational efficiency and/or other technical characteristics of the computing system that processes the resource records because a larger portion of resource records can be processed by the same automated tagging and aggregation pipeline without falling into an "untagged" exception path. As coverage increases, the computer performs fewer secondary operations that are typically triggered by untagged records, such as repeated reprocessing jobs, ad-hoc queries, manual review queues, custom mapping scripts, and/or iterative data exports/imports to resolve attribution gaps. By converting more records into deterministically tagged records at ingestion time (or shortly thereafter), the system reduces the volume of ambiguous records requiring additional CPU cycles, memory usage, and/or I/O for exception handling, and enables faster, more consistent generation of analytics outputs (e.g., allocations, reports, and alerts) over large-scale cloud utilization datasets.

Traditional virtual tag configuration requires manual analysis and rule creation, which is time-consuming, error-prone, and fails to adapt to evolving cloud infrastructure patterns.

At least one embodiment provides one or more of the following potential advantages:

Eliminates or significantly reduces manual analysis for virtual tag optimization.

Leverages AI semantic understanding to discover non-obvious tag relationships.

Provides quantifiable, preview-based impact metrics for each generated candidate rule.

Supports interactive selection of candidate rules with cumulative impact visualization.

Handles value mapping normalization automatically.

Scales across any number of tag keys and virtual tag configurations.

Maintains auditability through reasoning explanations for each suggestion.

Processes asynchronously with real-time progress feedback.

Integrates seamlessly with existing Virtual Tags infrastructure.

At least one embodiment provides one or more of the following improvements over existing approaches of generating rules for generation of virtual tags for resource records:

Semantic Concept Inference: The LLM analyzes existing rules to understand the concept being tagged, then searches for semantically related keys in untagged data.

Preview-Based Ranking: Rather than estimating impact, actual preview calculations provide ground-truth metrics for rule ranking.

Cumulative Selection Model: Users can select multiple rules and see the combined effect, accounting for overlapping coverage.

Automated Value Normalization: AI-suggested value mappings handle common variations (abbreviations, case differences) without manual configuration.

Progress Transparency: Real-time stage updates with token usage and timing metrics provide full visibility into the AI reasoning process.

At least one embodiment provides an AI-driven analysis pipeline that automatically discovers relevant tag keys from untagged cost data, generates candidate rules with semantic understanding, and ranks the candidate rules by measurable coverage improvement.

At least one embodiment implements a LLM for automatically expanding virtual tag coverage in cloud management systems, for example, cloud cost management systems. The LLM is used to analyze untagged cost data, discover semantic patterns in tag keys and values, and/or generate new tagging rules that reduce unallocated resources (e.g., costs). At least one embodiment may implement iterative preview simulations to rank candidate rules by their impact on coverage improvement, which may enable data-driven selection of optimal tag expansions. At least one embodiment provides real-time, scalable optimization of cloud resource (e.g., cost) attribution without or significantly reducing manual rule configuration.

At least one embodiment enhances the efficiency of virtual tag management in cloud resource (e.g., cost) allocation systems. AI semantic analysis may be combined with simulation-based impact measurement for automated discovery and/or ranking of tag expansion opportunities that are impractical to identify manually. The preview-based ranking help to ensure suggestions of candidate rules are backed by actual data, not estimates, while the interactive selection interface gives users full control over which rules to apply At least one embodiment enables dynamic, intelligent optimization, of resource utilization (e.g., cost) attribution coverage across diverse cloud environments.

At least one embodiment solves the aforementioned technical problem(s), and/or improves upon the aforementioned technology, and/or improves upon the aforementioned prior approaches, and/or provides the aforementioned practical application(s), by automatically generating rules for expanding coverage of existing virtual tags of a cloud computing environment and/or for generation of new virtual tags of the cloud computing environment. A database of resource records associated with the cloud computing environment is managed. Each resource record includes a resource value indicating utilization of a resource of the cloud computing environment. The database includes untagged resource records and tagged resource records (i.e., tagged with virtual tags). The tags of the tagged resource records may be automatically generated by existing rules which may be hosted in a rule repository. Coverage of the existing rules is insufficient to automatically generate tags for the untagged resource records. The untagged resource records may be automatically extracted from the database and/or automatically identified, for example, by issuing a query to the database. A key-value distribution associating aggregated resource values with tag key/tag value pairs extracted from each of the untagged resource records, may be automatically computed and/or generated. A structured prompt is automatically generated. The structured prompt includes one or more (optionally all) of: the existing rules for generating virtual tags, the key-value distribution, and instructions for identifying tag keys of the untagged resource records that are semantically related to a concept(s) represented by virtual tags generated based on the existing rules. The structured prompt may further include instructions for computing at least one new rule according to the identified tag keys. The new rule(s) is designed for generating at least one new virtual tag and/or for expanding coverage of existing virtual tag(s). The structured prompt is fed into a large language model (LLM) and/or other machine learning (ML) model such as an artificial intelligence (AI) agent. One or more new rules generated by the LLM are received. The new rule(s) may be evaluated, for example, by simulating application of each respective new rule to the untagged resource records, and computing one or more metrics indicating impact of the application of the rule on the resource values of the untagged resource records-some of which are tagged by the simulated application. One or more new rules may be selected, optionally based on the results of the simulation. The new rules (e.g., selected rules) are added to the rule repository associated with the database for application to the untagged resource records and/or to newly generated untagged resource records.

At least one embodiment may be integrated into another virtual tag processing process, by providing an intelligent automation layer that may perform one or more of: analyzing costs currently falling into "Untagged" categories, discovering tag keys and/or values semantically related to existing virtual tag concepts, generating new rules using AI reasoning about tag patterns, simulating each rule's impact through preview calculations, and/or presenting ranked suggestions with visual before/after comparisons.

At least one embodiment may provide a dramatic reduction in unallocated cloud costs through automated, AI-guided virtual tag expansion.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
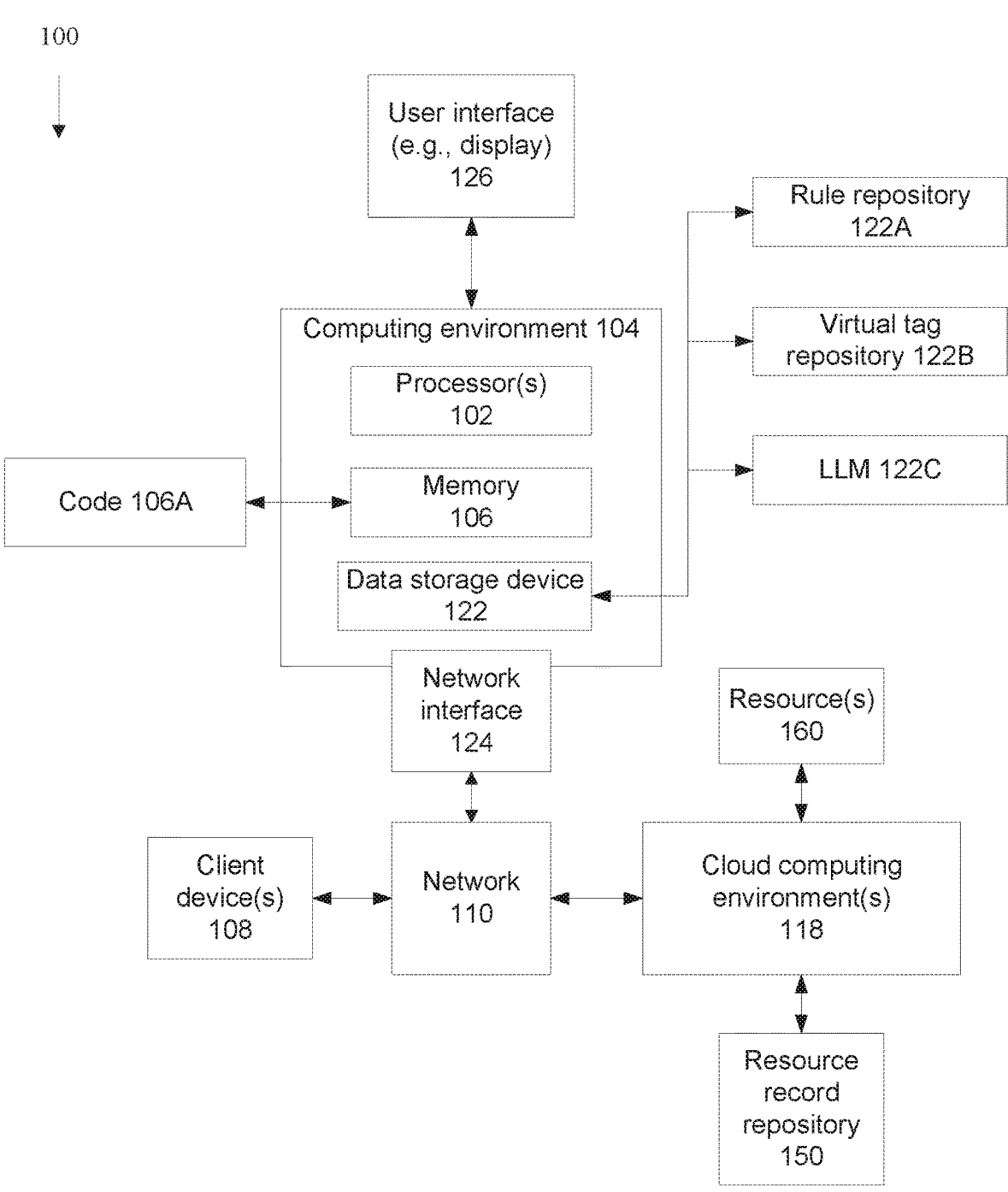
FIG. 1 is a block diagram of components of a system for automatically generating rules for creation of virtual tags, in accordance with some embodiments of the present invention.
Figure 2:
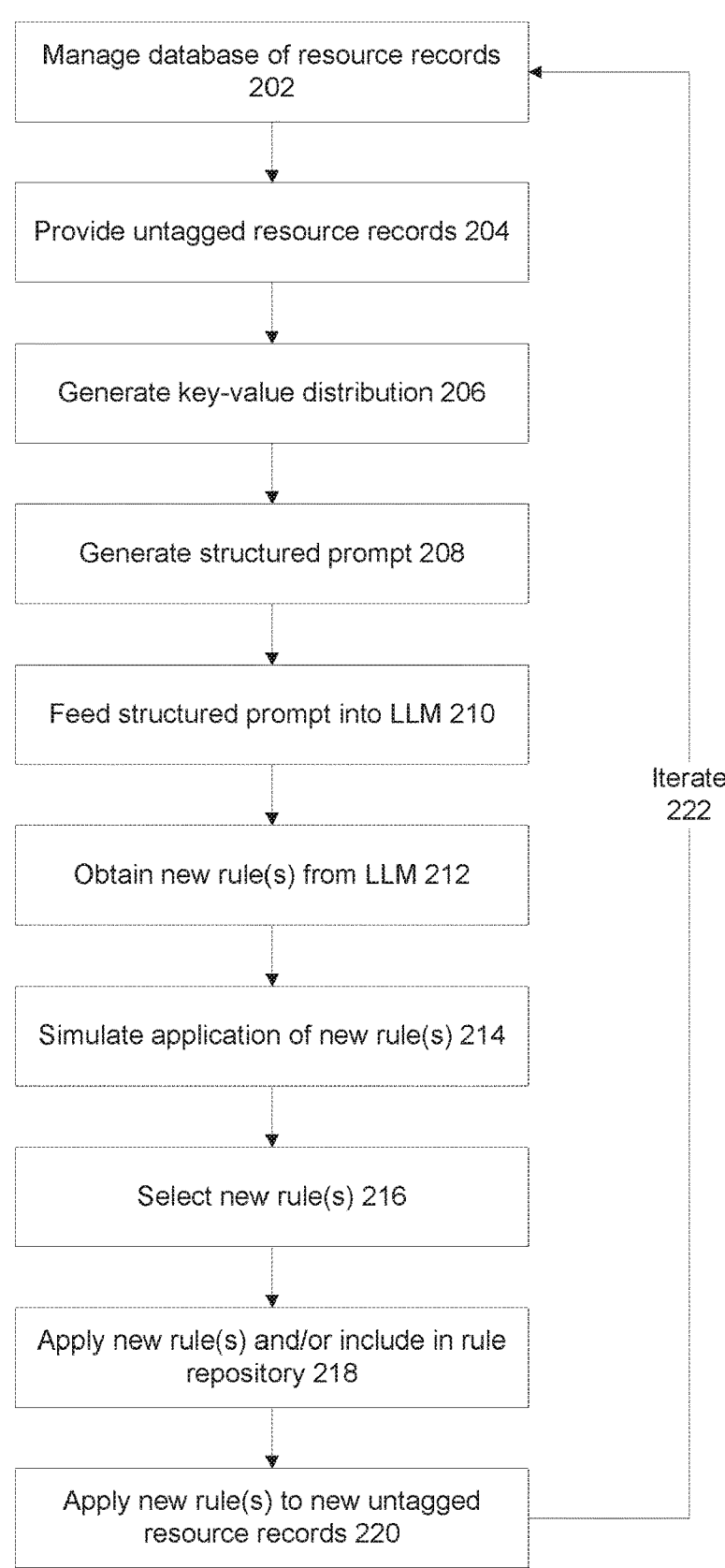
FIG. 2 is a flowchart of a method of automatically generating rules for creation of virtual tags, in accordance with some embodiments of the present invention.
Figure 3:
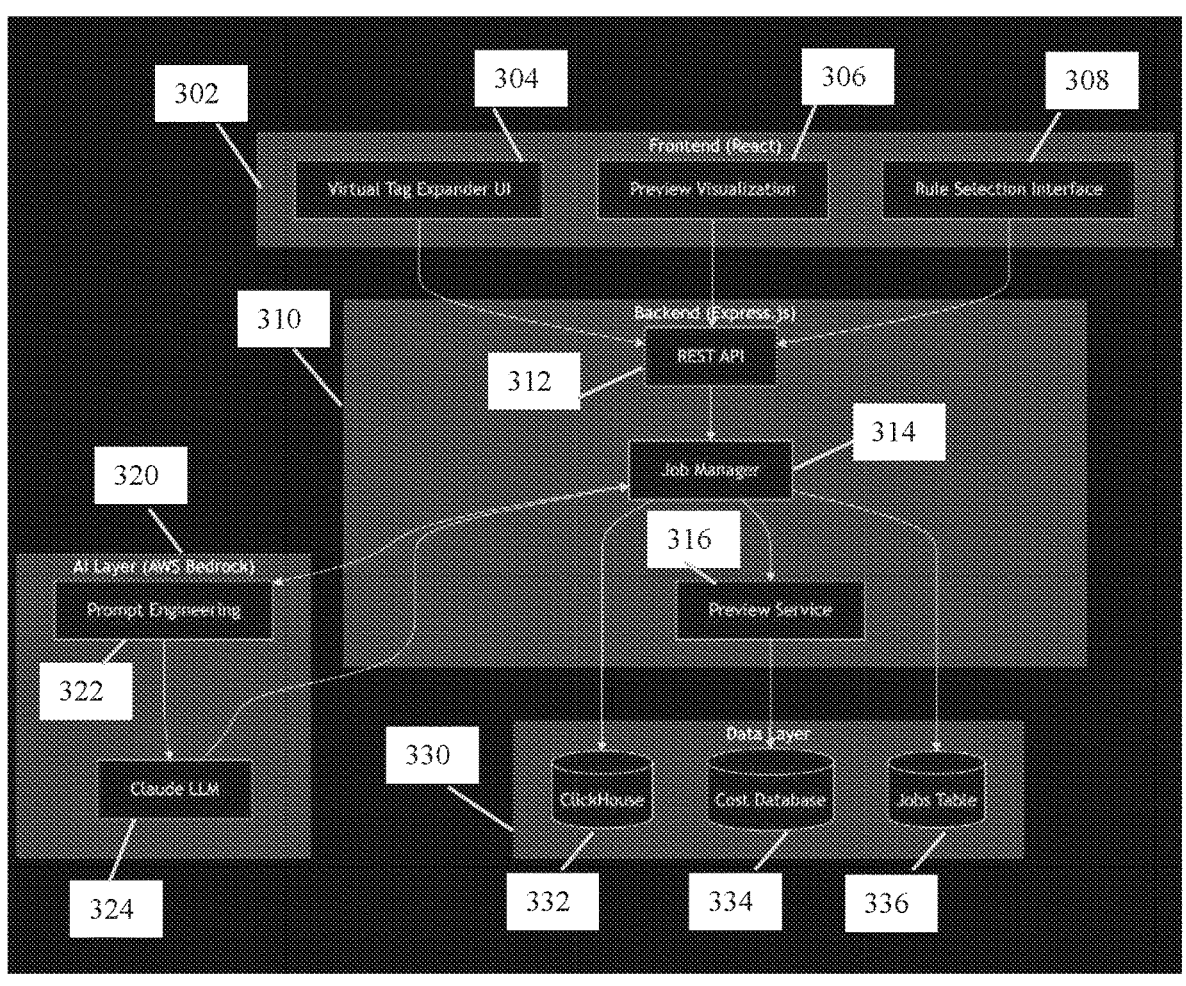
FIG. 3 is a block diagram depicting an exemplary architecture for automatically generating rules for creation of virtual tags, in accordance with some embodiments of the present invention.
Figure 4:
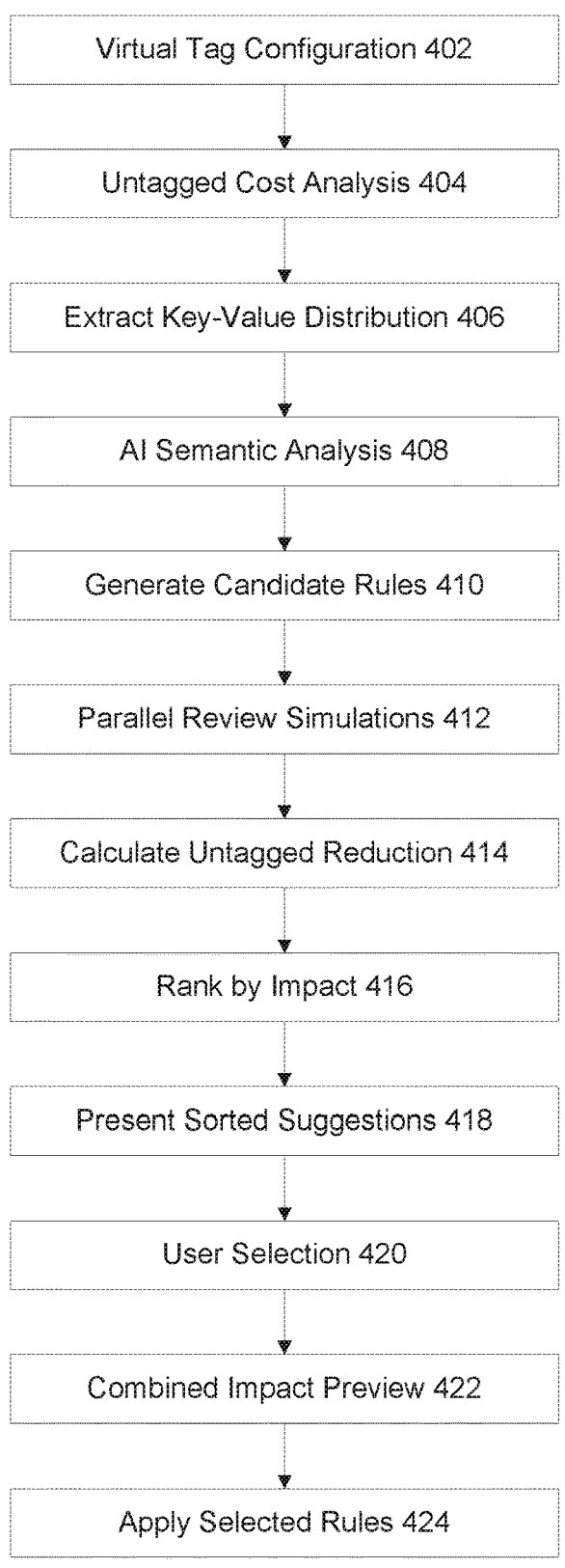
FIG. 4 is a flowchart of another exemplary process for automatically generating rules for creation of virtual tags, in accordance with some embodiments of the present invention.
Figure 5:
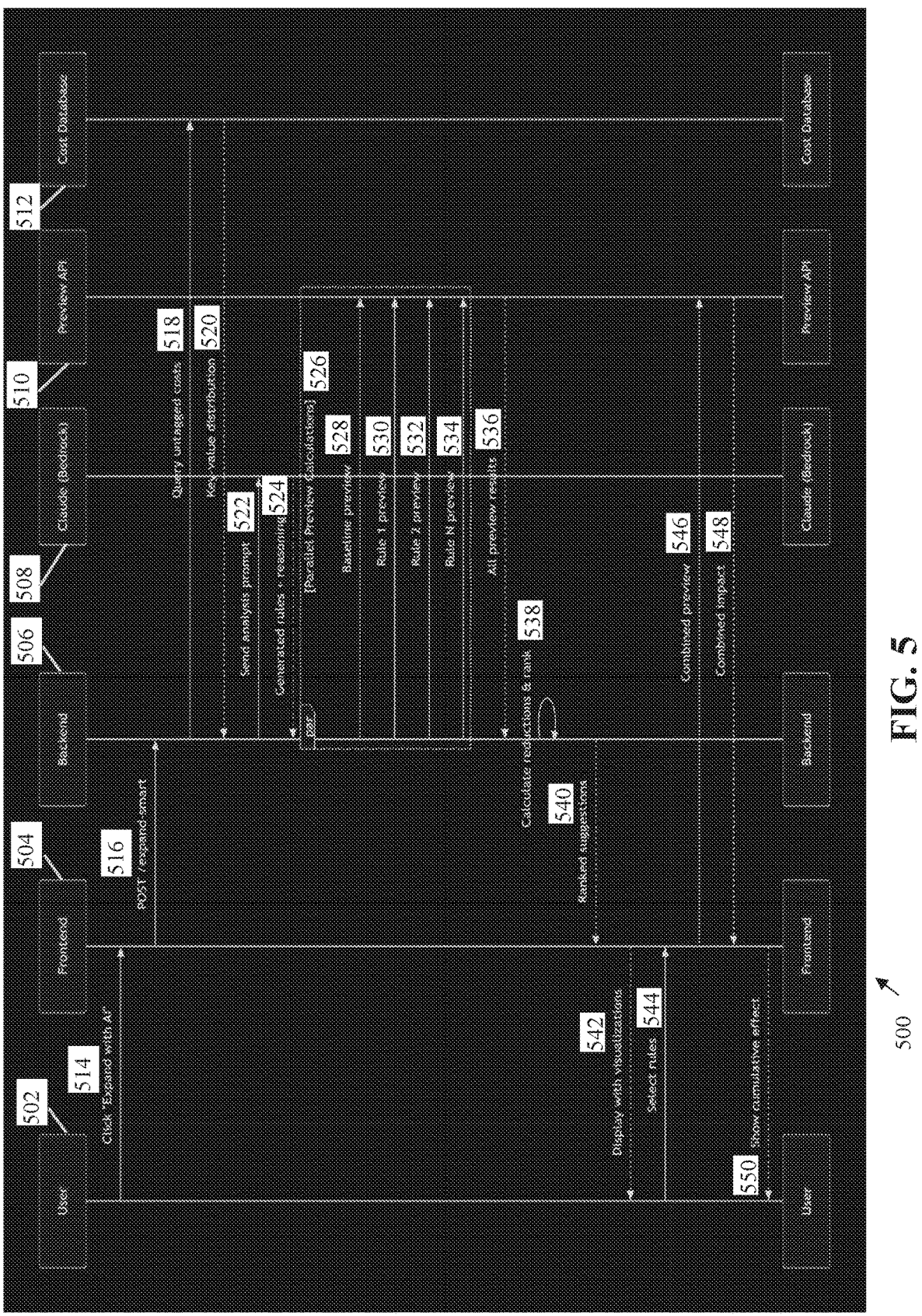
FIG. 5 is a sequence diagram for automatically generating rules for creation of virtual tags, in accordance with some embodiments of the present invention.

Reference is now made to FIG. 1, which is a block diagram of components of a system 100 for automatically generating rules for creation of virtual tags, in accordance with some embodiments of the present invention. Reference is also made to FIG. 2, which is a flowchart of a method of automatically generating rules for creation of virtual tags, in accordance with some embodiments of the present invention. Reference is also made to FIG. 3, which is a block diagram depicting an exemplary architecture 300 for automatically generating rules for creation of virtual tags, in accordance with some embodiments of the present invention. Reference is also made to FIG. 4, which is a flowchart of another exemplary process for automatically generating rules for creation of virtual tags, in accordance with some embodiments of the present invention. Reference is also made to FIG. 5, which is a sequence diagram 500 for automatically generating rules for creation of virtual tags, in accordance with some embodiments of the present invention. Reference is also made to FIG. 6, which is a dataflow diagram 600 for automatically generating rules for creation of virtual tags, in accordance with some embodiments of the present invention. Reference is also made to FIG. 7, which is a schematic 700 depicting an example of a reduction in a total resource value of untagged resource records in response to automated generation of at least one rule, in accordance with some embodiments of the present invention. Reference is also made to FIG. 8, which is an example of a query 800 for returning untagged resource records, in accordance with some embodiments of the present invention. Reference is also made to FIG. 9, which is an example of a prompt for feeding into a LLM for generation of one or more candidate rules, in accordance with some embodiments of the present invention.

Referring now back to FIG. 1, system 100 may implement the acts of the method(s) described with reference to one or more other FIGS., by processor(s) 102 of a computing environment 104 executing code instructions stored in a memory 106 (also referred to as a program store).

Computing environment 104 may be implemented as, for example one or more and/or combination of: a group of connected devices, a client terminal, a server, a virtual server, a cloud computing environment, a virtual machine, a desktop computer, a thin client, a network node, and/or a mobile device (e.g., a smartphone, a tablet computer, a laptop computer, a wearable computer, glasses computer, and a watch computer).

Computing environment 104 analyzes untagged resource records (e.g., from a resource record repository (also referred to herein as database) 150) associated with a cloud computing environment(s) 118, and uses a LLM 122C for automatically generating one or more new rules (e.g., stored in a rule repository 122A) which when applied to the untagged resource records generate new virtual tags (e.g., stored in a virtual tag repository 122B). The untagged resource records include a resource value indicating utilization of specific resource(s) 160 of the cloud computing environment(s) 118 performing a specific measurable activity.

It is to be understood that resource record repository 150 and/or rule repository 122A and/or virtual tag repository 122B and/or LLM 122C may be hosted by different storage devices and/or executed by different platforms, and what is depicted in FIG. 1 is a not necessarily limiting example. For example, resource record repository 150 may be hosted by data storage device 122. In another example, rule repository 122A may be hosted by an external server.

Cloud computing environment 118 is associated with and/or hosts one or more resources 160 which may be utilized by one or multiple entities, for example, via respective client devices 108.

Examples of resources 160 include: virtual machines, data storage, network bandwidth, managed databases, and use of software (e.g., software as a service).

Examples of client devices 108 used by different entities to access resources 160 of cloud computing environment(s) 118 include a client terminal, a server, a desktop computer, and a mobile device.

Cloud computing environment(s) 118 is not meant to be necessarily limiting, and may be implemented as another platform that hosts services and/or resources which are accessed by multiple users which may be external users (accessing via the network, via a virtual interface such as an application programming interface (API) and the like), for example, a virtual server, a virtual machine, and the like.

Multiple architectures of system 100 based on computing environment 104 may be implemented. For example:

Computing environment 104 executing stored code instructions 106A, may be implemented as one or more servers (e.g., network server, web server, a cloud computing environment, a virtual server) that provides centralized services to one or more cloud computing environments 118 and/or client devices 108, for centrally generating new rules (for storage in rule repository 122A) for application to untagged resource records (e.g., stored in resource record repository 150) for generating new virtual tags (for storage in virtual tag repository 122B). Services may be provided, for example, to one or more cloud computing environments (s) 118 and/or client terminal(s) 108 over network 110, by accessing and/or being provided the untagged resource records 150 associated with the cloud computing environments(s) 118. Services may be provided by computing environment 104 to client terminals 108 and/or cloud computing environments(s) 118, for example, as software as a service (Saas), a software interface (e.g., application programming interface (API), software development kit (SDK)), an application for local download to the client terminal(s) 108 and/or cloud computing environments(s) 118, an add-on to a web browser running on client terminal (s) 108 and/or cloud computing environments(s) 118, and/or providing functions using a remote access session to the client terminals 108 and/or cloud computing environment(s) 118, such as through a web browser executed by client terminal 108 and/or cloud computing environment(s) 118 accessing a web site hosted by computing environment 104. For example, computing environment 104 sends a query to a server hosting resource records 150 to obtain the untagged resource records, and automatically adds the generated (e.g., selected) rules to rule repository 122A.

In another example, computing environment 104 may be implemented to provide dedicated and/or local services to a certain cloud computing environment 118. For example, computing environment 104 may be integrated with cloud computing environment 118, such as code 106A of computing environment 104 may be executed by the processor(s) of cloud computing environment 118 by accessing resource records 150 hosted by cloud computing environment(s) 118. In another example, computing environment 104 may be implemented as an external device, such as an administrative server, in dedicated communication with cloud computing environment 118, to provide the services of analyzing resource records 150 for generating new rules for inclusion in rule repository 122A.

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method(s) described herein when executed by hardware processor(s) 102.

Computing environment 104 may include a data storage device 122 for storing data, for example, rule repository 122A, virtual tag repository 122B, LLM 122C, and/or other data described herein. Data storage device 122 may be implemented as, for example, a memory, a local hard-drive, virtual storage, a removable storage unit, an optical disk, a storage device, and/or as a remote server and/or cloud computing environment (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 includes and/or is in communication with one or more user interfaces 126, which may include a graphical user interface (GUI) designed to enable a user to view simulations based on application of the different candidate rules, and/or for selection of one or more of the candidate rules for implementation. Exemplary user interfaces 126 include, for example, one or more of, a touchscreen, a display, gesture activation devices, a keyboard, a mouse, and voice activated software using speakers and microphone.

Referring now back to FIG. 2, at 202, a database of resource records is managed, for example, provided, accessed, and the like.

Each resource record includes a resource value indicating utilization of a resource of multiple resources of the cloud computing environment.

The database includes multiple resources records that are tagged with one or more virtual tags (also referred to herein as tagged resource records) and one or more resource records that are untagged with virtual tags (also referred to herein as untagged resource records). The virtual tags are automatically generated according to existing rules, which may be hosted in a rule repository.

Optionally, the database is implemented a cost database. Each record may be implemented as a cost record. The resource value may be implemented as a cost of using the respective resource, for example billings in a selected currency for utilization of the respective resource.

Examples of resources include:

Virtual Machines (VMs): Virtual machines are software-based computing instances that mimic physical computers. Different types of VMs may be offered with varying configurations of CPU, memory, storage, and networking resources.

Containers: Containers are lightweight, portable, and self-contained units of software that package an application and its dependencies together.

Storage: Different types of storage resources may be offered, for example, object storage, block storage, and file storage.

Databases: For example, managed database services.

Networking: For example, virtual networks, load balancers, VPNs, firewalls, and other networking components that enable secure and efficient communication between cloud resources and the internet.

Content Delivery Networks (CDNs): CDNs are distributed networks of servers that cache and deliver static content (e.g., images, videos, CSS, and JavaScript files) to users based on their geographic location, improving website performance and reducing latency.

Serverless Computing: Serverless computing services allow developers to run code without provisioning or managing servers, enabling pay-per-use billing and automatic scaling.

Managed Services: For example, for application deployment, for batch and streaming data processing, and for event-driven architectures.

Analytics and Big Data: For example, for data analytics, data warehousing, and big data processing.

Artificial Intelligence (AI) and Machine Learning (ML): For example, pre-trained models, custom model training, and inference platforms.

Internet of Things (IoT): For example, for managing and processing data from connected devices.

The resource value (e.g., cost) may be computed according to one or more telemetry values, which indicate a measurable activity (e.g., indication of utilization) within the respective resource of the cloud computing environment. Examples of telemetry values include: amount of stored data, amount of used network bandwidth, utilization of a virtual machine, and the like. The resource value (e.g., cost) may be computed by multiplying the indication of utilization by a charge rate. For example, amount of stored data X cost per unit of storage. The measurable activity may be measured by a code sensor and/or a processor, which may monitor and/or access and/or query the specific resource within the cloud computing environment(s).

Each resource record is associated with a timestamp and/or metadata attributes. The metadata attributes may include additional data about the resource value. For example:

Resource ID: A unique identifier for the cloud resource being consumed, such as a virtual machine instance, storage volume, or database instance.

Resource Type: The type of cloud resource, such as compute, storage, networking, or managed services.

Service Name: The name of the specific cloud service being used.

Usage Quantity: The amount or quantity of the resource consumed, such as the number of hours a virtual machine was running or the amount of data transferred over the network.

Usage Unit: The unit of measurement for the usage quantity, such as hours, gigabytes, or requests.

Cost Rate: The rate or price charged for the usage of the resource, typically based on a predefined pricing model.

Total Cost: The total cost incurred for the specific resource usage, calculated by multiplying the usage quantity by the cost rate.

Cost Allocation: Information about how the cost is allocated or attributed to different departments, projects, or cost centers within the organization.

Billing Period: The time period or billing cycle to which the cost record belongs, such as a month or a specific date range.

Account ID: The identifier of the cloud account or subscription associated with the resource usage.

Region or Availability Zone: The geographic location or data center where the cloud resource was provisioned and used.

Cost Category: A classification or categorization of the cost, such as compute, storage, data transfer, or licensing fees.

Cost Tags: User-defined tags or labels that can be applied to cost records for better organization and cost allocation.

In some embodiments, the tagged resource records are tagged according to one or more existing rules stored in the rule repository. Each rule may define match criteria for selecting resource records and/or a virtual tag assignment (e.g., a virtual tag key and a virtual tag value) to apply to matching records. The match criteria may reference one or more metadata attributes of the resource records, including one or more native tag keys and corresponding tag values, account identifiers, resource identifiers, resource types, service identifiers, regions, and/or other metadata described herein.

The following some examples of rules for generating virtual tags.

Example 1—Team Allocation Based on a Native Tag Key

Virtual tag key: vt: team
Rule logic:
  IF native tag owner equals "team-a" OR "TeamA" THEN assign vt: team="Team A"
  ELSE IF native tag owner equals "team-b" THEN assign vt: team="Team B"
  ELSE assign vt: team="Untagged"

Example 2—Environment Allocation Using Value Normalization

Virtual tag key: vt: environment
Rule logic:
  IF native tag env IN ("prod", "production", "prd") THEN assign vt: environment="Production"
  ELSE IF native tag env IN ("dev", "development") THEN assign vt: environment="Development"
  ELSE IF native tag env IN ("test", "qa", "staging", "stage") THEN assign vt: environment="Non-Production"
  ELSE assign vt: environment="Untagged"

Example 3—Application Allocation Based on Kubernetes Labels

Virtual tag key: vt: application
Rule logic:
  IF native tag k8s.label.app equals "checkout" THEN assign vt: application="Checkout Service"
  ELSE IF native tag k8s.label.app.kubernetes.io/name equals "billing" THEN assign vt: application="Billing Service"
  ELSE assign vt: application="Untagged"

Example 4—Cost Center Allocation Based on Account/Subscription Metadata

Virtual tag key: vt: costcenter
Rule logic:
  IF accountid equals "123456789012" THEN assign vt: costcenter="CC-1001"
  ELSE IF subscriptionid equals "sub-0027" THEN assign vt: costcenter="CC-2040"
  ELSE assign vt: costcenter="Untagged"

Example 5—Business Unit Allocation Using Resource Name Patterns (Regex/Prefix)

Virtual tag key: vt: businessunit
Rule logic:
  IF resourcename matches regex^fin-. THEN assign vt: businessunit="Finance"
  ELSE IF resourcename matches regex^hr-. THEN assign vt: businessunit="HR"

ELSE assign vt: businessunit="Untagged"

Example 6—Project Allocation Using Multiple Attributes (Compound Condition)

Virtual tag key: vt: project
Rule logic:
  IF native tag project is present THEN assign vt: project=<value of native tag project<
  ELSE IF (resourcegroup equals "rg-analytics" AND servicename equals "data-warehouse") THEN assign vt: project="Analytics"
  ELSE assign vt: project="Untagged"

Example 7—Region-Based Allocation (Geo Tagging)

Virtual tag key: vt: regiongroup
Rule logic:
  IF region IN ("us-east-1", "us-west-2") THEN assign vt: regiongroup="US"
  ELSE IF region IN ("eu-west-1", "eu-central-1") THEN assign vt: regiongroup="EU"
  ELSE assign vt: regiongroup="Other/Unknown"

At 204, untagged resource records hosted by the database are provided, for example, obtained, identified, extracted and/or accessed.

The untagged resource records may be extracted by generating a query for searching the database for untagged resource records. For example, searching for all resource records which are untagged.

In another example, the virtual tag is provided. At least one embodiment may expand coverage for the provided virtual tag, by generating additional rules for the provided virtual tag to identify additional untagged resource records which are to be labelled using the provided virtual tag. The virtual tag may be provided, for example, manually entered by a user, and/or automatically selected by code. In at least one embodiment, each defined virtual tag is automatically and iteratively selected (e.g., sequentially and/or in parallel) in an attempt to expand coverage of the respective virtual tag. The prompt may be defined for searching for resource records classified as untagged for the provided virtual tag.

The query is executed to extract the untagged resource records. The query may be executed, for example, by the database, and/or by a search engine running over the records of the database.

The query may include instructions to filter resource records to include resource records currently classified with a virtual tag value of "Untagged".

The query may include instructions to exclude specified tag keys, for example, identified as provider system tags and/or otherwise non-actionable keys.

For each identified untagged resource record (e.g., returned by the query), the following data may be extracted: available tag keys, corresponding values (of the tag key), and/or the resource value.

At 206, a key-value distribution is generated from the untagged resource records. The key-value distribution may be generated by associating aggregated resource values with tag key/tag value pairs extracted from each of the untagged resource records.

In some embodiments, the key-value distribution is a data structure (e.g., a table, map, dictionary, or other associative array) that, for each observed tag key and each observed tag value of that tag key within the untagged resource records, stores one or more aggregated statistics indicating the magnitude of resource utilization represented by that key/value pair.

In some embodiments, the key-value distribution is computed by iterating over each untagged resource record and, for each tag key/value pair present in that record, updating one or more aggregation counters for that tag key/value pair. The aggregation counters may include one or more of: (i) an aggregated resource value (e.g., a sum of costs), (ii) a record count, (iii) a distinct resource count (e.g., unique resource identifiers), (iv) a time-based aggregation (e.g., per day or per billing period), and/or (v) one or more representative sample attributes (e.g., example resource names) for downstream explanation.

Optionally, tag keys and/or tag values are normalized for aggregation (without necessarily modifying the underlying records), for example: lowercasing keys, trimming whitespace, mapping equivalent delimiters (e.g., "team-name" and "teamname"), and/or folding synonymous values into a canonical form (e.g., "prod" and "production"), such that the distribution reflects consolidated totals.

Optionally, the untagged resource records are filtered to generate a set of filtered untagged resource records. The key-value distribution is generated from the filtered untagged resource records. The filtering may be performed based on instructions in the prompt. The filtering may be performed by filtering tag keys to for excluding cloud-provider system tag keys, for example, that are unrelated to a target concept.

Alternatively or additionally, the key-value distribution is filtered by excluding tag keys identified as non-actionable system/provider keys, and/or by removing entries below a minimum impact threshold (e.g., excluding (k,v) pairs with aggregated resource value below a configured threshold). The key-value distribution may be sorted, for example, by decreasing aggregated resource value to prioritize the most impactful candidate keys/values.

Alternatively or additionally, the filtering is performed on the key-value distribution to generated a filtered key-value distribution. The filtering may be performed by excluding tag key/tag value pairs associated with an aggregated resource value below a threshold.

Tags may be filtered to exclude common cloud provider system tags that do not represent target concept(s), for example, business concepts.

The key-value distribution may be analyzed to identify which tags have significant resource value coverage potential. For example, tag key/tag value pairs with aggregated resource value above the threshold may be retained.

Examples of computed key-value distributions computed from untagged resource records include:

For a selected time window, assume the untagged resource records include the following simplified entries:
  Record r1, resource value of 100, and tag of owner=TeamA, env-prod
  Record r2, resource value of 200, and tag of owner=TeamA, env=prod
  Record r3, resource value of 300, and tag of owner=TeamB, env=dev
  Record r4, resource value of 150, and tag of app=checkout, env=prod
  A computed key-value distribution (showing total_cost and record_count) may be:
  owner-TeamA→totalcost=300, recordcount=2
  owner-TeamB→totalcost=300, recordcount=1
  env=prod→totalcost=450, recordcount=3
  env=dev→totalcost=300, recordcount=1 app=checkout→totalcost=150, recordcount=1

This distribution indicates that introducing rules based on env and/or owner may materially reduce untagged cost.

At 208, a structured prompt is automatically generated.

The structured prompt includes one or more (optionally all) of the following:

Existing rules for generating virtual tags. The existing rules for generating virtual tags may be analyzed to identify one or more concepts being tagged, for example, team, environment, application, and the like.

The key-value distribution generated from the untagged resource records.

Instructions for identifying tag keys of the untagged resource records that are semantically related to a concept represented by virtual tags generated based on the existing rules, and for computing at least one new rule according to the identified tag keys. The new rule(s) is for generating a new virtual tag and/or expanding coverage of at least one existing virtual tag.

Instructions for analyzing the existing rules to extract of target concepts being tagged and/or for generating the new rule(s) to generate the virtual tag(s) based on the target concepts and/or for expanding coverage of existing virtual tag(s) based on the target concept.

Instructions to normalize the tag values to comply with existing taxonomy of the virtual tags. Alternatively, the instructions may be to evaluate the tag values as being normalized, rather than tamper with the actual tag values of the resource records. For example, normalize between "prod" and "production".

Instructions for analyzing semantic relationships between one or more of: patterns of existing rules for generating virtual tags, available tag keys in the untagged resource records, and value patterns that suggest conceptual alignment.

The structured prompt may instruct the LLM to analyze existing rules to understand concepts (e.g., business concepts) being tagged, to search for semantically related keys in the untagged resource records, and generate new rules that generate virtual tag(s) for the identified semantically related keys.

The structured prompt may be automatically generated, for example, by populating a predefined template.

Optionally, two structured prompts are generated. The first structured prompt instructs the LLM to identify concepts being tagged. The second structured prompt instructs the LLM to use the identified concepts (identified in response to executing the first prompt) to search for semantically related keys in the untagged resource records for generation of new rules.

Referring now back to FIG. 9, prompt 900 may be implemented as a template that includes variable fields populated at runtime, for example, a virtual tag identifier (e.g., {name}), a summarized representation of existing rule logic (e.g., {existing_rules_summary}), and a key-value distribution derived from untagged cost records (e.g., {key_value_distribution}).

The {existing_rules_summary} portion may convey to the LLM the current allocation intent and/or operational constraints of the virtual tag, such as which attributes are presently used for classification, representative match patterns, and/or the existing virtual tag value taxonomy. The {key_value_distribution} portion may provide a structured snapshot of the untagged records, for example, listing candidate tag keys and/or their observed values along with associated aggregate costs and/or record counts, which may enable the LLM to evaluate which keys are likely to have material coverage potential.

The instruction portion of the prompt directs the LLM to identify semantically related tag keys—that is, tag keys whose values appear to represent the same concept as the subject virtual tag (e.g., team, environment, application) despite differing naming conventions across systems. The prompt further requests that, for each suggested rule, the LLM output (i) a complete rule specification in a format compatible with the virtual tagging engine (e.g., including key name, match operators, and value-to-allocation mappings), (ii) reasoning explaining why the identified key is relevant to the virtual tag concept, and (iii) an estimated coverage improvement indicating an expected reduction in untagged cost. In some embodiments, the structured output is formatted (e.g., JSON or another machine-readable schema) to facilitate automated parsing, validation, and/or subsequent preview-based evaluation of the candidate rules.

Referring now back to FIG. 2, at 210, the structured prompt is fed into a large language model (LLM) and/or other machine learning model, such as an AI-agent.

The LLM and/or other machine learning model may be implemented based on one or more neural network architectures, for example, convolutional, fully connected, deep, encoder-decoder, recurrent, transformer, graph, and combinations of the aforementioned. Other architectures besides neural network may be implemented.

The LLM may identify candidate keys likely to include values representing the same concept (e.g., business concept).

At 212, one or more new rules are generated by the LLM.

The new rule(s) generated by the LLM are obtained, for example, received from the LLM and/or accessed from a data storage device that hosts the new rule(s) generated by the LLM.

The new rule(s) may represent candidate rule(s), which may be evaluated for selecting one or more target rules to implement.

The new rule(s) may be generated in a predefined format, for example, as defined by a downstream process designed to generate the virtual tags. The new rule(s) may be defined, for example, according to a predefined template, a predefined data structure, and the like.

The LLM may identify at least one candidate tag key likely to be associated with values of the candidate tag key representing same or corresponding target concepts. The LLM generates the new rule(s) based on the candidate tag key(s).

The LLM may analyze the existing rules to infer a target concept represented by the virtual tag (e.g., team/owner, application, or environment). The LLM may then evaluate the key-value distribution of untagged resource records to identify at least one candidate tag key whose name and/or observed values indicate the same or a corresponding concept, even if the candidate tag key is different from the tag keys used by the existing rules. For example, when existing rules use an owner tag to assign a team virtual tag, the LLM may identify semantically similar keys such as team, application_owner, or k8s.label.team. The LLM then generates one or more new rules that reference the candidate tag key(s), optionally including value normalization or mapping (e.g., "TeamC"→"Team C"), to assign a virtual tag value in a format compatible with the rule repository and tagging engine.

The LLM may generate a rule specification. The rule specification may be generated for complying with a format of rules stored in a rule repository applied to new resource records. The rule specification may be formatted, for example, for direct storage in, and/or execution by, the same rule repository and/or virtual tagging engine that applies existing rules to resource records. In some embodiments, the rule specification is produced in a machine-readable representation (e.g., JSON, YAML, or another structured format) and includes sufficient fields to allow automated parsing, validation, ordering, and execution of the rule against existing untagged resource records and/or newly ingested resource records.

The rule specification may include each new rule and at least one of:

Filter conditions (match criteria). One or more conditions that define which resource records the rule applies to. The conditions may reference attributes present in the resource record, such as a native tag key name, a native tag value, an account identifier, a resource type, a service name, a region, and/or other metadata attributes. The conditions may specify operators such as equality, inclusion in a list, substring match, prefix match, or a constrained regular expression match. For example, filtering may be based on one or more parameters, for example, cost center, key name, operator, and the like. For example, a rule may specify that it applies when tag_key="k8s.label.team" and tag_value IN {"team-a", "team-b"}, or when service_name="Kubernetes" and tag_key exists.

Target allocation mapping (assignment action). An instruction describing how the virtual tag should be set when the filter conditions are satisfied. The mapping may assign a single virtual tag value, or may include a value-to-value mapping table that converts observed values under a candidate tag key into canonical virtual tag values in an existing taxonomy (e.g., mapping "team-c" to "Team C"). In some embodiments, the assignment action specifies the virtual tag key to set (e.g., vt: team) and the virtual tag value (or mapped value) to assign, thereby defining how resource values (e.g., cost) associated with the matching records are attributed in downstream processing. I.e., how resource values should be attributed.

Reasoning explaining why a candidate tag key associated with the new rule is semantically relevant. Textual and/or structured reasoning generated by the LLM indicating why the candidate tag key used in the rule is semantically relevant to the virtual tag concept and why the rule is expected to expand coverage. For example, the reasoning may state that the candidate key name (e.g., application_owner or k8s.label.team) is semantically aligned with the ownership/team concept represented by existing rules, and that the key-value distribution shows a material aggregated resource value associated with that key in untagged records. In some embodiments, the reasoning may be stored as audit metadata alongside the rule specification to support later review, compliance, and debugging.

Optionally, for tag keys that do not exactly match existing allocations of existing virtual tags, the LLM may perform a semantic similarity analysis to generate mappings between observed tag values and existing allocation values. For example, the LLM may identify mapping such as "dev"→"development". The mappings may be designed to preserve an existing taxonomy implemented by existing virtual tags while expanding coverage for including new virtual tags generated by the new rule(s) and/or for expanding coverage of existing virtual tag(s) generated by the new rule(s).

The following is an example illustrating inputs provided to the LLM (e.g., virtual tag, existing rules, and key-value distribution derived from untagged records—as described for example with reference to 208) and an example LLM output including a complete rule specification and reasoning describing semantic relevance of the identified key(s):

Virtual Tag to Expand

Virtual tag key: vt: team

Purpose/concept: allocate each resource record to an organizational owning team

Default/unmatched value: "Untagged"

Allowed values (taxonomy): ["Team A", "Team B", "Team C", "Shared", "Unknown"]

Existing Rules for the Virtual Tag (Excerpt from Rule Repository)

In this example, rules are evaluated in order (first match wins):

1. Rule name: TeamFromOwnerTag_TeamA
   IF owner IN ["TeamA", "team-a", "A-Team"]
   THEN set vt: team="Team A"
2. Rule name: TeamFromOwnerTag_TeamB
   IF owner IN ["TeamB", "team-b"]
   THEN set vt: team="Team B"
3. Rule name: SharedFromCostCenter
   IF cost center EQUALS "CC-SHARED"
   THEN set vt: team="Shared"
4. Rule name: DefaultUntagged
   ELSE set vt: team="Untagged"

The following distribution was computed from records where vt: team="Untagged" for a selected period:

```
[
{"tagkey": "team", "tagvalue": "TeamC", "totalcost":
  5420.10, "recordcount": 812},
{"tagkey": "k8s.label.team", "tagvalue": "team-c", "total-
  cost": 4875.00, "recordcount": 690},
{"tagkey": "applicationowner", "tagvalue": "TeamC",
  "totalcost": 3211.00, "recordcount": 402},
{"tagkey": "k8s.label.owner", "tagvalue": "TeamB",
  "totalcost": 1330.25, "recordcount": 141},
{"tagkey": "team", "tagvalue": "Team A", "totalcost":
  1180.50, "recordcount": 233},
{"tagkey": "env", "tagvalue": "prod", "totalcost":
  9900.00, "recordcount": 2100} ]
```

Notably, env=prod has high cost but does not represent a team/ownership concept; therefore it is not a preferred candidate for expanding vt: team.

The following is an example of a response by the LLM, including several candidate rules, to expand coverage of the label "vt: team" (ranked by expected impact). Based on the existing vt: team rules (which currently assign teams using the native tag key owner) and the tag key/value patterns found in untagged records, the LLM suggests the following new rules. Each suggested rule uses a tag key that appears to represent the same "team ownership" concept as owner, but under a different naming convention.

Candidate rule 1—Use the team tag to assign vt: team (high impact) Proposed rule: If a record has a native tag key team, use its value to set vt: team, with normalization to match the existing taxonomy.

Example Mappings:
team="TeamC"→ set vt: team="Team C"
team="Team A"→ set vt: team="Team A"
team="TeamB"→ set vt: team="Team B"

Why this key is relevant (semantic match): The existing rules treat owner as the team identifier. In the untagged records, the key team appears frequently with values that look like team names (e.g., "TeamC"), indicating it represents the same ownership/team concept as owner, just labeled differently.

Candidate rule 2—Use the Kubernetes label k8s.label. team to assign vt: team (high impact)

Proposed rule: If a record has the Kubernetes label k8s.label.team, map common values to the canonical vt: team values.

Example Mappings:

k8s.label.team="team-c"→set vt: team="Team C"
k8s.label.team="team-a"→set vt: team="Team A"
k8s.label.team="team-b"→set vt: team="Team B"

Why this key is relevant (semantic match): Kubernetes environments often store ownership metadata as labels rather than cloud-provider tags. The label name explicitly contains "team" and the values resemble team identifiers, so it is semantically aligned with the vt: team concept.

Candidate rule 3—Use the applicationowner tag to assign vt: team (medium/high impact) Proposed rule: If a record has applicationowner, treat it as a team/ownership field and map it into the existing team taxonomy.

Example Mappings:

application_owner="TeamC"→set vt: team="Team C"

Why this key is relevant (semantic match): "Application owner" commonly refers to the team responsible for a workload. The untagged distribution shows significant cost where "TeamC" appears under this key, indicating the same ownership concept is present but under a more descriptive key name.

Candidate rule 4—Use the Kubernetes label k8s.label. owner to assign vt: team (medium impact)

Proposed rule: If a record has k8s.label. owner, map its value to vt: team using the same team mappings used for owner.

Example Mappings:

k8s.label.owner="TeamB"→set vt: team="Team B"

Why this key is relevant (semantic match): This key is effectively the Kubernetes form of the existing key owner. The untagged records show meaningful usage of k8s.label. owner, which strongly suggests it encodes the same ownership concept as the tag key used by the current rules.

Note: The LLM did not recommend using keys such as env for vt: team, even though env-prod appears with high untagged cost, because environment metadata is not semantically related to team ownership and would likely cause incorrect allocations.

At 214, application of one or more of the candidate rule(s) generated by the LLM to the untagged resource records to generate virtual tags, may be simulated. The simulation may be designed to provide accuracy, data-driven impact metrics.

In one exemplary implementation of the simulation, a baseline total of multiple resource values is computed for the untagged resource records. The baseline total may represent the amount of resources which are untagged due to lack of coverage by the rules. The baseline may be computed using the existing data, prior to application of any of the new rules generated by the LLM. The simulated metric computed for each respective candidate rule may include a simulated total of the resource values for a subset of the untagged records for which virtual tags were computed by the simulated application of the respective candidate rule. An absolute improvement provided by the simulated total for the respective candidate rule over the baseline total may be computed. In other words, the simulated metric may represent the reduction in the amount of resources that are unaffiliated with tags, due to the expanded coverage by the respective candidate rule, which associates some of the previously untagged resources with new tags and/or with existing tags using the candidate rule. The absolute improvement may be computed as baseline total-simulated total.

Alternatively or additionally, in another exemplary implementation of the simulation, a relative improvement provided by the simulated total for the respective candidate rule with respect to the baseline total, is computed.

Optionally, rules that would increase the amount of untagged resource records, increase the baseline total, and/or have minimal impact (e.g., generating a reduction than a threshold defined as not sufficiently significant) may be excluded from being selected.

The results of the simulation may be presented on a display, optionally within an interactive user interface (e.g., GUI). The presentation may include one or more of:

Data indicating of the untagged resource records and after application of one or more rules. For example, the baseline total of the untagged resources, and predicted reduction after application of one or more rules. The reduction may be presented in absolute and/or relative terms.

Specific cost amounts in dollars that are tagged by application of one or more rules.

AI-generated reasoning for the suggestion of selected rule(s).

Interactive element(s) designed for a user to select one or a combination of two or more rules, run the simulation on the selected rule(s), and view the outcome of application the selected rule(s).

At 216, one or more of the generated new rule(s) (i.e., candidate rules) may be selected. The selection may be performed based on the metric(s) computed by the simulation. For example, the new candidate rules may be ranked according to corresponding simulated metrics, and a highest ranked candidate rule(s) may be selected. The candidate rules may be ranked according to corresponding absolute improvement. Alternatively or additionally, the candidate rules may be ranked according to corresponding relative improvements.

The selection may be automatic, for example, the highest ranked rule(s) may be automatically selected.

Alternatively or additionally, the selection may be performed via a user interface (e.g., graphical user interface (GUI)) designed to present the generated candidate rules on a display. A user may inspect the candidate rules, and select one or more of the automatically generated candidate rules for implementation. The user interface may present the results of the simulation, such as computed metric(s) and/or rankings of the candidate rules(s).

At 218, the selected candidate rule(s) (e.g., highest ranked candidate rule) may be applied to the untagged resource records, for automatically generating new virtual tags.

Alternatively or additionally, the selected candidate rule(s) (e.g., highest ranked candidate rule) may be added as new rule(s) to the rule repository associated with the database.

For example, the highest ranked candidate rule(s) with highest absolute improvement may be applied to the untagged resource records and/or added to the rule repository. Alternatively or additionally, the candidate rule(s) with highest relative improvement may be selected and applied to the untagged resource records and/or added to the rule repository.

The new rule(s) is designed be applied to exiting untagged resource records and/or to new untagged resource records (e.g., newly generated), for expanding coverage, thereby tagging additional resource records which would remain untagged without the new rule(s).

At 220, one or more new resource records may be automatically generated for the cloud computing environment, for example, in response to detected utilization of a resource.

For example, a cloud provider exports hourly usage events indicating that a particular virtual machine instance (e.g., instance ID i-0ABC123) consumed 2.0 compute-hours in a given hour and incurred a cost of $0.48. In response, an ingestion service of the computing environment automatically creates a new resource record in the database that includes: a timestamp for the hour, the resource identifier, the resource type (e.g., "compute/VM"), the measured usage quantity (e.g., 2.0 compute-hours), the corresponding resource value (e.g., $0.48), and metadata attributes (e.g., account ID, region, and any available native tags or Kubernetes labels). The record is initially stored as untagged for at least one virtual tag (e.g., vt: team="Untagged") until the rule repository (including the newly added rule(s)) is applied to assign one or more virtual tags.

The generated new resource record is untagged. Rule(s) of the rule repository, including the new rule(s) generated as described herein, are applied to the new untagged resource record. A new virtual tag is generated by the application of the new rule(s). Coverage has been expanded by the new rule—i.e., the new virtual tag for the new untagged resource record is generated based on a new rule. The expanded coverage by the new rule is in contrast to no virtual tag being generated for the new virtual tag using the previous rules in the rule repository that excluded the new rule. An association between the new resource record and the new virtual tag is stored in the database.

At 222, one or more features described with reference to 202-220 may be iterated, for dynamically generating new rule(s) and/or for dynamically applying the new rule(s) to new untagged resource records.

Optionally, data associated with each iteration may be stored on a data storage device (e.g., persisted) for future review, adaptation, selection, application, and the like.

Optionally one or more features of the process described with reference to FIG. 2 may be run as a background process job. Real-time indications of progress may be dynamically updated and presented on a display, for example, a bar graph within a defined range, a timer, and the like. The real-time progress may be presented via stages, which may correspond to the features of FIG. 2, for example, fetching the untagged resource records, generating the prompt, performing a simulation, and the like.

Once the new rule(s) are applied and the previously untagged resource records are newly tagged with one or more virtual tags, the newly tagged resource records may be automatically processed by downstream cloud management functions. For example, the computing environment may aggregate the tagged resource values by virtual tag values (e.g., by team, application, environment, and/or cost center) to generate chargeback/showback reports, budgeting forecasts, and anomaly alerts; enforce policies and controls associated with particular tags (e.g., compliance rules, approval workflows, and retention policies); and drive automated optimization actions such as identifying underutilized resources attributable to a particular team or application, allocating savings-plan reservations, and generating dashboards that provide near real-time visibility into resource utilization and spend by the virtual tag taxonomy.

Referring now back to FIG. 3, architecture 300 includes a frontend 302, for example implemented using React, a backend 310, for example implemented using Express.js, an AI layer 320, for example implemented using AWS Bedrock, and a data layer 330.

Frontend 302 includes a virtual tag expander user interface (UI) 304 designed to initiate an expansion workflow and present suggested virtual tagging rules, a preview visualization component 306 designed to present comparative preview results (e.g., before/after application of one or more candidate rules), and a rule selection interface 308 configured to receive user selections of one or more candidate rules for application and/or further previewing.

Backend 310 includes a REST API 312 designed to receive requests from the frontend 302 and return results thereto, a job manager 314 designed to create, schedule, and/or monitor asynchronous processing jobs, and a preview service 316 designed to perform preview computations for baseline and modified virtual tag configurations and to generate impact metrics associated with candidate rules.

AI layer 320 includes a prompt engineering module 322 designed to generate and/or format structured prompts, and LLM 324 designed to process the structured prompts and output candidate rule specifications and/or associated explanatory text.

The data layer 330 includes a ClickHouse data store 332 designed to support analytical queries, a cost database 334 designed to store cost and/or utilization records associated with cloud resources and/or corresponding tag metadata, and a jobs table 336 designed to persist job state, intermediate outputs, and/or final results for later retrieval, auditing, or application. Communications among the components may occur over one or more networks using suitable protocols, for example, including HTTP(S) calls between the frontend 302 and the REST API 312 and/or service calls between the backend 310 and the AI layer 320 and data layer 330.

Referring back to FIG. 4, one or more features described with reference to FIG. 4 may be implemented by, and/or integrated with, and/or may be provided in addition to, and/or may be alternatives to, one or more features described with reference to FIG. 2.

At 402, virtual tag configuration is performed. A virtual tag definition may be accessed, including existing rule logic, an "untagged" classification used for records that do not match the existing rules, and associated allocation/value taxonomy. In some embodiments, the configuration is retrieved from a rule repository and loaded into a preview or evaluation context.

At 404, an untagged cost analysis is performed. Cost and/or utilization records are analyzed to identify line items currently classified as untagged for the virtual tag(s). In some embodiments, the analysis for a defined time window, cloud account scope, and/or service scope. Records may be filtered to remove noise or records lacking actionable attributes.

At 406, a key-value distribution is extracted. For the untagged records, tag keys and corresponding values are extracted and aggregated to produce a key-value distribution. The distribution may include, for each tag key/value pair, a summed cost (or utilization), record counts, and/or representative sample values. Certain keys (e.g., provider system keys) may be excluded.

At 408, a semantic analysis is performed by a LLM (or other AI model). A structured representation of the existing virtual tag rules and the extracted distribution is provided to the LLM for semantic analysis. The LLM evaluates semantic relationships between the concept represented by the existing virtual tag(s) and tag keys/values present in the untagged records. The output may include candidate tag keys predicted to correspond to the same concept.

At 410, one or more candidate rules are generated. Based on the semantic analysis, candidate rules are generated, optionally in a format compatible with a virtual tagging engine. Each candidate rule may include, for example, match criteria (e.g., key name and operator), allocation mapping to a virtual tag value, and optional normalization and/or value-mapping guidance. In some embodiments, the candidate rules include machine-generated explanatory text for review.

At 412, one or more simulations are performed, optionally in parallel. Each candidate rule is evaluated using preview calculations. The previews may be executed in parallel across multiple candidate rules to reduce total evaluation time. Each preview produces an allocation result for the candidate rule when applied in addition to the existing rules.

At 414, a simulated reduction in untagged records may be computed in response to implementing each candidate rule. For each candidate rule, a baseline preview result may be compared to a modified preview result to determine a reduction in untagged cost and/or untagged records attributable to the candidate rule. Metrics may include, for example, absolute reduction and/or percentage reduction relative to baseline.

At 416, the candidate rules may be ranked according to the computed impact metrics, such as highest untagged reduction and/or highest percentage improvement. Candidate rules that fail criteria (e.g., negligible impact, conflicting behavior, and/or undesired allocation changes) may be filtered out.

At 418, the ranked candidate rules are presented on a display by a user interface as suggested rule additions. The presentation may include before/after allocation summaries, numerical impact metrics, and the AI-generated reasoning. The user may expand a suggestion to view underlying matched keys/values and example affected records.

At 420, a user selection made via the user interface is received. The user selects one or more candidate rules to evaluate further and/or to adopt. The interface may permit selection of multiple rules, editing of mappings, and/or re-ordering of rule precedence.

At 422, a combined impact preview is generated. A combined preview simulation may be performed using the selected rules together with the existing rules to estimate cumulative impact. The combined preview accounts for overlaps among the selected rules so that double-counting is avoided. The combined preview results may be presented as aggregate impact metrics and updated visualizations.

At 424, the selected rules are applied. The selected rules are implemented, for example by storing the selected rules in a rule repository. Subsequent cost and/or utilization records are processed using the updated configuration, generating virtual tag values according to the selected rules.

Referring back to FIG. 5, one or more features described with reference to FIG. 5 may be implemented by, and/or integrated with, and/or may be provided in addition to, and/or may be alternatives to, one or more features described with reference to FIG. 2 and/or FIG. 4.

The sequence diagram of FIG. 5 depicts exemplary flow between a user 502, a front end 504, a backend 506, a LLM 508, a preview API 510, and a cost database 512.

At 514, user 502 initiates expansion of coverage for resource records. The user 502 interacts with the frontend

504 to trigger the process of expanding coverage by generating additional rules based on untagged resource records, as described herein.

At 516, frontend 504 triggers backend 506. In response to the user action, the frontend 504 sends a request to the backend 506, for example POST/expand-smart.

At 518, backend 506 generates and sends a query to cost database 512 to extract resource records classified as untagged.

At 520, the cost database 512 returns a key-value distribution (as described herein).

At 522, backend 506 sends analysis prompt to LLM (522). The backend 506 generates and transmits a structured prompt to the LLM service 508. The prompt may include a summary of existing virtual tag rules, at least a portion of the key-value distribution, and/or instructions to identify semantically related keys and generate candidate rules.

At 524, the LLM generates candidate rules and optional reasoning. The LLM service 508 processes the prompt and returns suggested rule specifications. The response may further include explanatory text describing semantic rationale and, in some embodiments, suggested value normalizations or mappings.

At 526, Preview calculations are performed, optionally in parallel. The backend 506 submits preview computation requests to the preview API 510 for evaluation of the candidate rules. The requests may be issued concurrently (e.g., for efficiency).

At 528, a baseline preview is computed. The preview API 510 computes a baseline preview using the existing rules without new candidate rules. The baseline preview provides a reference untagged amount and allocation distribution used to compute incremental impact.

At 530, 532, and 534, multiple per-rule previews are computed. For each candidate rule (e.g., rule 1, rule 2, through rule N), the preview API 510 computes a modified preview allocation that applies the candidate rule in addition to the existing rules. Each per-rule preview yields a modified untagged amount for that candidate rule.

At 536, the preview API provides the computed preview results. The preview API 510 returns the baseline preview and the per-rule previews to the backend 506. The returned results may include untagged totals, per-category allocations, and/or other metrics that may be used for ranking and/or display.

At 538, the backend calculates reductions in the untagged resource values and ranks the corresponding rules. The backend 506 computes metrics for each candidate rule, such as absolute and/or percentage untagged reduction relative to the baseline preview. The backend 506 ranks the candidate rules according to the metrics.

At 540, the backend returns ranked suggestions. The backend 506 transmits the ranked list of candidate rules to the frontend 504. The response may include rule specifications, impact metrics, and/or LLM-provided reasoning suitable for presentation in a user interface.

At 542, the ranking may be displayed optionally with visualization. The frontend 504 may render the ranked suggestions and associated visualizations, such as before/after allocation charts derived from the preview results. The interface may enable the user to inspect details of each candidate rule prior to selection.

At 544, one or more rules are selected. The user 502 may use a user interface (e.g., GUI) to select one or more candidate rules for combined evaluation and/or adoption.

At 546, a combined preview is generated. The frontend 504 may request a combined preview from the preview API 510 for the selected rules applied together with the existing configuration. The combined preview request may be used to evaluate cumulative effect and avoid double counting when multiple rules overlap in coverage.

At 548, the combined impact is provided. The preview API 510 computes and returns combined impact results for the selected rules. The results may include cumulative untagged reduction and/or an updated allocation distribution reflecting the combined rule set.

At 550, the cumulative effect is presented. The frontend 504 presents the combined preview results to the user 502, including cumulative impact metrics and/or updated visualizations. The user may then proceed to apply the selected rules or modify the selection and rerun the combined preview.

Referring back to FIG. 6, one or more features described with reference to FIG. 6 may be implemented by, and/or integrated with, and/or may be provided in addition to, and/or may be alternatives to, one or more features described with reference to FIGS. 2-5.

Input data 602 includes existing virtual tags 604 (e.g., virtual tag definitions and existing rules) and untagged costs 606 (e.g., resource records and/or cost records currently classified as untagged for at least one virtual tag).

An AI analytics block 608 (e.g., LLM) includes a concept extraction 610 process, a key discovery 612 process, and a value matching 614 process. The existing virtual tags 604 are provided to the concept extraction 610, which determines one or more concepts represented by the existing virtual tags (e.g., team, environment, application, service, or other allocation concepts) based on the existing rule logic and associated virtual tag values. The untagged costs 606 are provided to the key discovery 612, which identifies candidate tag keys in the untagged cost records that may be usable for generation of new rules.

Outputs from concept extraction 610 and key discovery 612 are provided to value matching 614, which correlates discovered keys with the extracted concepts. Based on the value matching 614, the AI analytics block 608 outputs candidate rule specifications, for example, as a first rule 618 associated with tag::team, a second rule 620 associated with tag::environment, and a third rule 622 associated with pod_label::app, each of which may be stored and/or evaluated for application to allocate at least a portion of the untagged costs 606 to generate new virtual tags.

Referring now back to FIG. 7, schematic depicts the examples of the reduction in the total resource value of untagged resource records in response to automated generation of at least one rule by at least one embodiment described herein. A baseline state 702 represents the initial state prior to generation of at least one rule. The virtual tag value Team A 704 is associated with an aggregated cost of $5000. The virtual tag value Team B 706 is associated with an aggregated cost of $3000. A total cost computed from cost records which are untagged is $12,000 (708). After adding a rule 710 (generated by at least one embodiment), the state is now: Team A 704 and Team B 706 (as in baseline state 702), with a new virtual tag Team C 712 associated with an aggregate cost $4500. A total cost computed from cost records which are untagged is $7500 (714).

An impact calculation 720 may be performed to determine the impact of the new generated rule. At 722, the reduction in the total cost computed from cost records in response to implementing the new rule is computed as $12000 (from 708)–$7500 (from 714)=$4500. At 724, the improvement is computed as 37.5% (i.e., $4500/$12000).

Referring now back to FIG. 8, query 800 is executed against a cost database (e.g., cost_data) that stores cost records and associated tag metadata, including a tag key field, a tag value field, and a cost field. The query includes instructions to filter the cost line items to those currently classified with a virtual tag value of "Untagged" (e.g., WHERE virtual_tag_value='Untagged'), thereby restricting the analysis to records that are not allocated by existing virtual tag rules. The query may include instructions to exclude specified tag keys identified as provider system tags or otherwise non-actionable keys (e.g., AND key NOT IN (excluded_system_tags)), where excluded_system_tags represents a configurable list of keys to be ignored for allocation analysis. The query includes instructions to aggregate the filtered records by tag key and tag value (e.g., GROUP BY key, value) and compute summary statistics for each key/value pair, including an aggregated cost total (e.g., SUM (cost) AS total_cost) and an associated record count (e.g., COUNT (*) AS record_count). The query includes instructions to apply a minimum-impact criterion (e.g., HAVING total_cost>threshold) to remove low-cost key/value pairs that are unlikely to materially affect coverage. The resulting key/value pairs are then ordered by descending total cost (e.g., ORDER BY total_cost DESC) to prioritize tag keys and values associated with the greatest untagged spend for downstream processing, such as candidate key selection, prompt construction for AI analysis, and preview-based evaluation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant cloud computing environments will be developed and the scope of the term cloud computing environment is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of automatically generating rules for expanding coverage of existing virtual tags and/or for generation of new virtual tags of a cloud computing environment, comprising:
  managing a database of resource records, wherein each resource record includes a resource value indicating utilization of a resource of a plurality of resources of the cloud computing environment, wherein the database includes a plurality of untagged resource records and a plurality of tagged resource records;
  extracting the plurality of untagged resource records from the database;
  generating a key-value distribution associating aggregated resource values with tag key/tag value pairs extracted from each of the plurality of untagged resource records;
  generating a structured prompt including: existing rules for generating virtual tags, the key-value distribution, and instructions for identifying tag keys of the plurality of untagged resource records that are semantically related to a concept represented by virtual tags generated based on the existing rules, and for computing at least one new rule according to the identified tag keys, the at least one new rule is for generating at least one new virtual tag and/or for expanding coverage of at least one existing virtual tag;
  feeding the structured prompt into a large language model (LLM);
  receiving the at least one new rule from the LLM; and
  adding the at least one new rule to a rule repository associated with the database for application to the plurality of untagged resource records and to new untagged resource records.

2. The computer implemented method of claim 1, further comprising:
  receiving a new resource record generated for the cloud computing environment, wherein the new resource record is untagged;
  applying the at least one new rule to the new resource record for generating the new virtual tag and/or expanding coverage of the at least one existing virtual tag;
  storing an association between the new resource record and the new virtual tag and/or expanded existing virtual tag in the database.

3. The computer implemented method of claim 2, wherein the new resource record is automatically generated in response to detected utilization of a resource of the plurality of resources.

4. The computer implemented method of claim 1, wherein the at least one new rule comprises a plurality of candidate new rules, and further comprising:
  for each respective candidate rule of the plurality of candidate rules, simulating application of the respective candidate rule to the plurality of untagged resource records to simulate generation of virtual tags to obtain a simulated metric;
  ranking the plurality of new candidate rules according to corresponding simulated metrics; and
  selecting a highest ranked candidate rule,
  wherein the at least one new rule added to a rule repository comprises the highest ranked candidate rule.

5. The computer implemented method of claim 4, further comprising:
  computing a baseline total of a plurality of resource values for the plurality of untagged resource records;
  for each respective candidate rule of the plurality of candidate rules:
    the simulated metric comprises a simulated total of the plurality of resource values for a subset of the plurality of untagged records for which virtual tags were computed by the simulated application of the respective candidate rule;

computing an absolute improvement provided by the simulated total for the respective candidate rule over the baseline total, wherein ranking comprises ranking the plurality of candidate rules according to corresponding absolute improvement, wherein the highest ranked candidate rule comprises the candidate rule with highest absolute improvement, wherein the at least one new rule added to the rule repository comprises the candidate rule with highest absolute improvement.

6. The computer implemented method of claim 4, further comprising:

computing a baseline total of a plurality of resource values for the plurality of untagged resource records;

for each respective candidate rule of the plurality of candidate rules:

the simulated metric comprises a simulated total of the plurality of resource values for a subset of the plurality of untagged records for which virtual tags were computed by the simulated application of the respective candidate rule;

computing a relative improvement provided by the simulated total for the respective candidate rule with respect to the baseline total, wherein ranking comprises ranking the plurality of candidate rules according to corresponding relative improvement, wherein the highest ranked candidate rule comprises the candidate rule with highest relative improvement, wherein the at least one new rule added to the rule repository comprises the candidate rule with highest relative improvement.

7. The computer implemented method of claim 1, wherein the database includes tagged resource records tagged with virtual tags generated according to a plurality of existing rules hosted in a rule repository.

8. The computer implemented method of claim 1, wherein extracting the plurality of untagged resource records from the database comprises generating a query for searching the database for untagged resource records, and executing the query to extract the plurality of untagged resource records.

9. The computer implemented method of claim 1, wherein the database comprises a cost database, wherein each record comprises a cost record, and the resource value comprises a cost of using the resource.

10. The computer implemented method of claim 1, further comprising filtering tag keys to generate filtered tag keys that exclude cloud-provider system tag keys that are unrelated to a target concept, wherein the key-value distribution is generated from the filtered tag keys.

11. The computer implemented method of claim 1, wherein the structured prompt further includes instructions for analyzing the existing rules to extract a plurality of target concepts being tagged and for generating the at least one new rule to generate the at least one virtual tag based on the plurality of target concepts.

12. The computer implemented method of claim 1, wherein the structured prompt includes instructions for analyzing semantic relationships between: patterns of existing rules for generating virtual tags, available tag keys in the untagged resource records, and value patterns that suggest conceptual alignment.

13. The computer implemented method of claim 1, wherein the LLM identifies at least one candidate tag key likely to be associated with values of the candidate tag key representing same or corresponding target concepts, wherein the LLM generates the at least one new rule based on the at least one candidate tag key.

14. The computer implemented method of claim 1, wherein the LLM generates a rule specification including each new rule and at least one of: filter conditions, target allocation mapping, and reasoning explaining why a candidate tag key associated with the new rule is semantically relevant.

15. The computer implemented method of claim 14, wherein the rule specification is generated for complying with a format of rules stored in a rule repository applied to new resource records.

16. The computer implemented method of claim 1, wherein the LLM normalizes the tag values to comply with an existing taxonomy of the virtual tag.

17. The computer implemented method of claim 1, wherein for tag keys that do not exactly match existing allocations of existing virtual tags, the LLM performs a semantic similarity analysis to generate mappings between observed tag values and existing allocation values, wherein the mappings are designed to preserve an existing taxonomy implemented by existing virtual tags while expanding coverage for including at least one new virtual tag and/or expanding coverage of the at least one existing virtual tag generated by the at least one new rule.

18. A system for automatically generating rules for expanding coverage of existing virtual tags and/or for generation of new virtual tags of a cloud computing environment, comprising:

at least one processor executing a code for:

managing a database of resource records, wherein each resource record includes a resource value indicating utilization of a resource of a plurality of resources of the cloud computing environment, wherein the database includes a plurality of untagged resource records and a plurality of tagged resource records;

extracting the plurality of untagged resource records from the database;

generating a key-value distribution associating aggregated resource values with tag key/tag value pairs extracted from each of the plurality of untagged resource records;

generating a structured prompt including: existing rules for generating virtual tags, the key-value distribution, and instructions for identifying tag keys of the plurality of untagged resource records that are semantically related to a concept represented by virtual tags generated based on the existing rules, and for computing at least one new rule according to the identified tag keys, the at least one new rule is for generating at least one new virtual tag and/or for expanding coverage of at least one existing virtual tag;

feeding the structured prompt into a large language model (LLM);

receiving the at least one new rule from the LLM; and adding the at least one new rule to a rule repository associated with the database for application to the plurality of untagged resource records and to new untagged resource records.

19. A non-transitory medium storing program instructions for expanding coverage of existing virtual tags and/or for generation of new virtual tags of a cloud computing environment, which when executed by at least one processor, cause the at least one processor to:

manage a database of resource records, wherein each resource record includes a resource value indicating utilization of a resource of a plurality of resources of the cloud computing environment, wherein the database includes a plurality of untagged resource records and a plurality of tagged resource records;

extract the plurality of untagged resource records from the database;

generate a key-value distribution associating aggregated resource values with tag key/tag value pairs extracted from each of the plurality of untagged resource records;

generate a structured prompt including: existing rules for generating virtual tags, the key-value distribution, and instructions for identifying tag keys of the plurality of untagged resource records that are semantically related to a concept represented by virtual tags generated based on the existing rules, and for computing at least one new rule according to the identified tag keys, the at least one new rule is for generating at least one new virtual tag and/or for expanding coverage of at least one existing virtual tag;

feed the structured prompt into a large language model (LLM);

receive the at least one new rule from the LLM; and add the at least one new rule to a rule repository associated with the database for application to the plurality of untagged resource records and to new untagged resource records.

\* \* \* \* \*